US008917866B2

(12) United States Patent
Chiang (10) Patent No.: US 8,917,866 B2
(45) Date of Patent: Dec. 23, 2014

(54) TELEPHONE WITH LOCKING MECHANISM (71) Applicant: Hon Hai Precision Industry Co., Ltd., New Taipei (TW)

(72) Inventor: Qiao-Lun Chiang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/010,531

(22) Filed: Aug. 27, 2013

(65) Prior Publication Data

US 2014/0064477 A1    Mar. 6, 2014

(30) Foreign Application Priority Data

Aug. 28, 2012 (TW) .............................. 101216544 U (51) Int. Cl.
*H04M 1/00* (2006.01)
*H04M 1/11* (2006.01)
*H04M 1/06* (2006.01)

(52) U.S. Cl.
CPC . *H04M 1/11* (2013.01); *H04M 1/06* (2013.01)
USPC ............ 379/446; 379/447; 379/449; 379/455

(58) Field of Classification Search
USPC .................................. 379/446, 447, 449, 455
See application file for complete search history.

(56) References Cited

U.S. PATENT DOCUMENTS 5,029,236 A * 7/1991 Yasuda et al. .............. 455/575.9

* cited by examiner

*Primary Examiner* — Alexander Jamal
(74) *Attorney, Agent, or Firm* — Novak Druce Connolly Bove + Quigg LLP (57) ABSTRACT

A telephone uses a locking mechanism for a handset where the handset includes a receiver part and a microphone part. The receiver part defines a receiving groove facing the microphone part. The telephone set includes a holding part to hold the handset. The holding part includes a first portion. The first portion defines a recess to receive the receiver part, and an accommodating space to receive the locking mechanism. The locking mechanism is rotatably received in the accommodating space and is switchable between a first state and a second state. The locking mechanism has a locking block. In the second state, the locking block is locked in the receiving groove of the receiver part to prevent release of the handset from the telephone set.

20 Claims, 9 Drawing Sheets

TELEPHONE WITH LOCKING MECHANISM

BACKGROUND

1. Technical Field

The present disclosure generally relates to a telephone, and particularly to a telephone having a locking mechanism.

2. Description of Related Art

A telephone includes a telephone set and a handset arranged on the telephone set. Most telephones include a supporting apparatus to support the telephone sets at an angle relative to a flat surface, such as a surface of a desktop or tabletop. However, it is possible for the handset to fall from the telephone set when the telephone set is supported at a different angle.

What is needed, therefore, is a means which can overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Reference will be made to the drawings to describe various embodiments.

Figure 1:
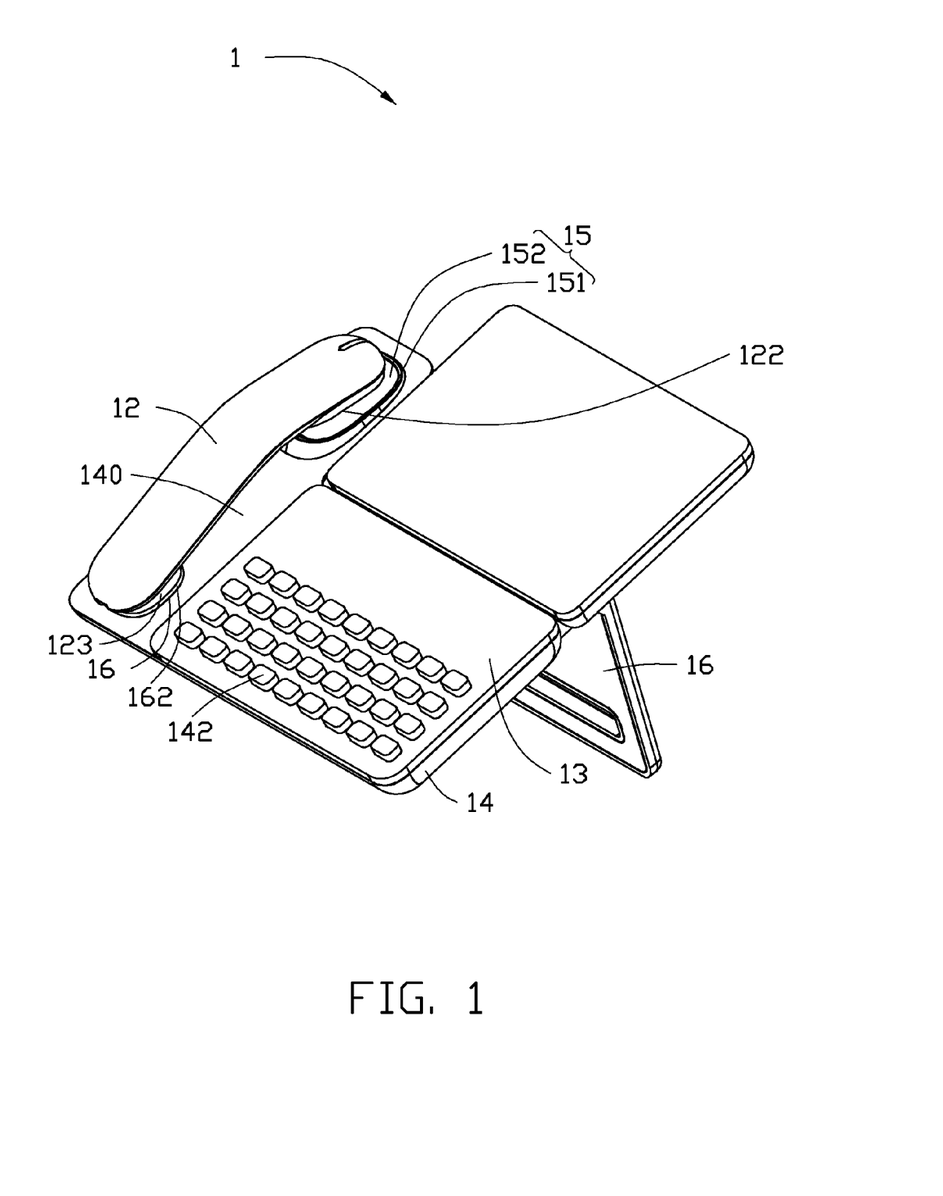
FIG. 1 is an isometric view of a telephone according to a first embodiment of the disclosure, where the telephone includes a handset, a telephone set, and a locking mechanism.
Figure 2:
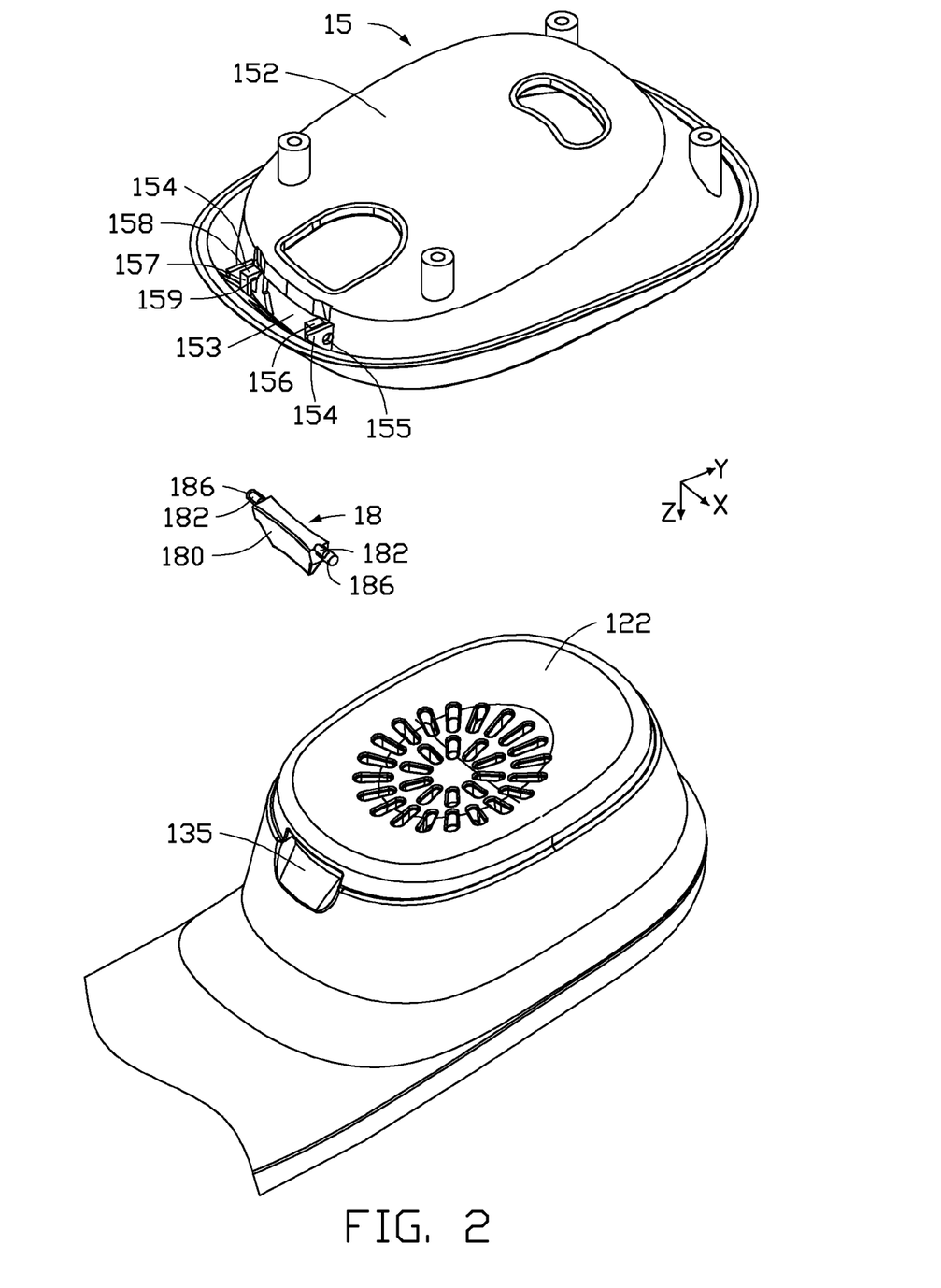
FIG. 2 is a partial exploded, isometric view of the telephone of FIG. 1.

Referring to FIGS. 1-2, in a first embodiment, a telephone 1 includes a telephone set 13, a handset 12, and a locking mechanism 18. The telephone set 13 can be directly placed on a flat surface, such as a desktop or tabletop, or be supported on the flat surface via a supporting apparatus 16, such that the telephone set 13 is angled relative to the flat surface. The handset 12 is arranged on the telephone set 13. The handset 12 can be picked up from and replaced on the telephone set 13.

The handset 12 includes a receiver part 122 and a microphone part 123. The receiver part 122 defines a receiving groove 135 facing the microphone part 123.

The telephone set 13 includes a casing 14. The casing 14 includes a button module 142 and a holding part 140 holding the handset 12. The holding part 140 includes a first portion 15 and a second portion 16. The first portion 15 and the second portion 16 are located at opposite ends of the holding part 140. The first portion 15 defines a first recess 152 receiving the receiver part 122 of the handset 12. The second portion 16 defines a second recess 162 receiving the microphone part 123 of the handset 12. The first portion 15 defines an accommodating space 153 at an inner surface 151 of the first portion 15. The accommodating space 153 communicates with the first recess 152, and the accommodating space 153 faces the receiving groove 135 of the receiver part 122 when the receiver part 122 is received in the first recess 152. Two supporting plates 154 are fixed in the accommodating space 153. Each supporting plate 154 defines a through hole 155. The through holes 155 are coaxial with each other, and a connecting line between the centers of the through holes 155 is parallel to a first direction. The first direction is parallel to an X-axis of an X-Y-Z plane as shown in FIG. 2. Two limiting frames 156 are fixed in the accommodating space 153 and are located between the two supporting plates 154. Each limiting frame 156 includes a limiting beam 158 extending along a second direction perpendicular to the first direction, and a connecting beam 157 extending along a third direction perpendicular to the first and second directions. The connecting beam 157 connects the limiting beam 158 to the first portion 15. The second direction is a direction parallel to a Y-axis of the X-Y-Z plane as shown in FIG. 2, and the third direction is a direction parallel to a Z-axis of the X-Y-Z plane as shown in FIG. 2. Each limiting beam 158 includes a protruding strip 159 extending from the limiting beam 158. The protruding strip 159 extends along the first direction.

The locking mechanism 18 includes a locking block 180, two first spindles 186 extending along the first direction, and two second spindles 182 also extending along the first direction. The first spindles 186 extend from two opposite sides of the locking block 180. The first spindles 186 and the second spindles 182 are parallel to each other and are connected to each other along their side surfaces, such that the first spindle 182 and the second spindle 186 define a first intersection line 183 and a second intersection line 184. The first and second intersection lines 183, 184 are parallel to the first direction. A length of the first spindle 186 is greater than a length of the second spindle 182.

Figure 3:
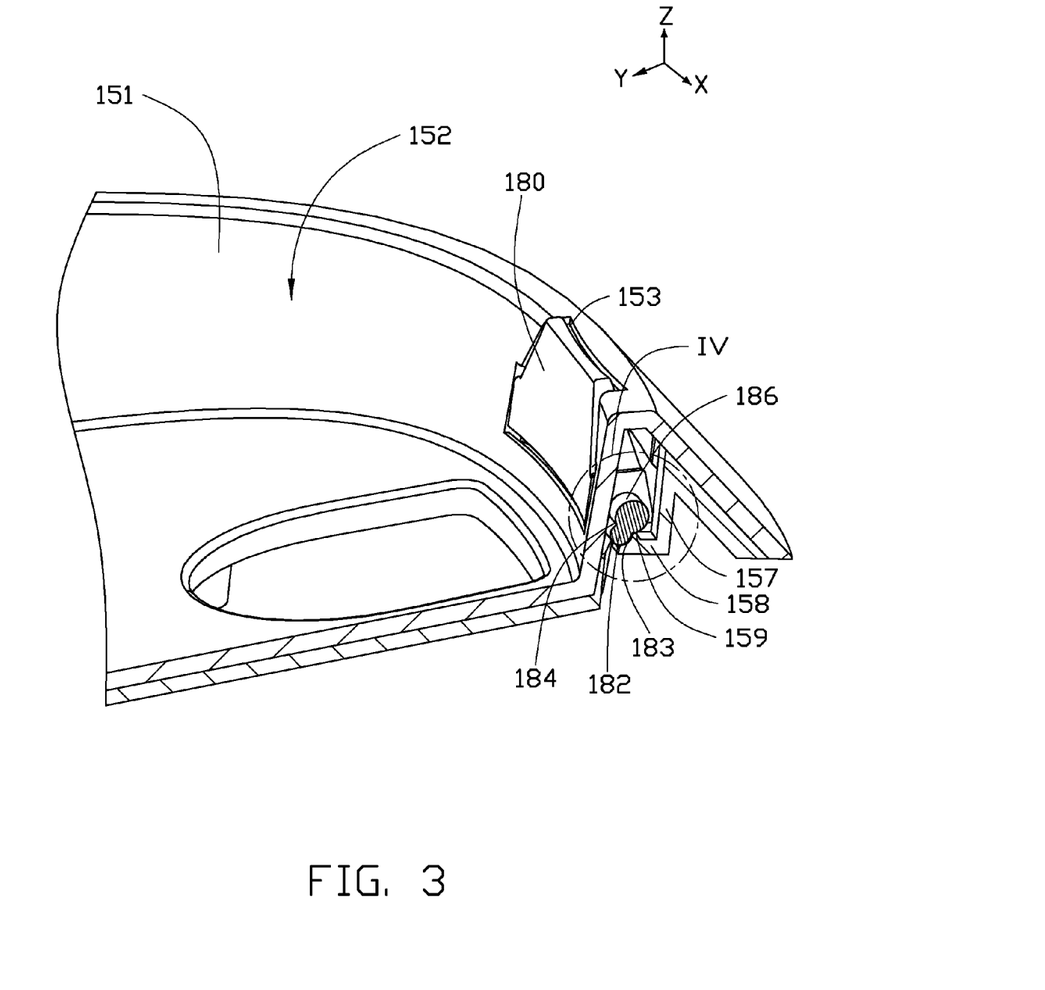
FIG. 3 is a partial assembled, isometric view of the telephone of FIG. 2, showing a locking block in a first state.
Figure 4:
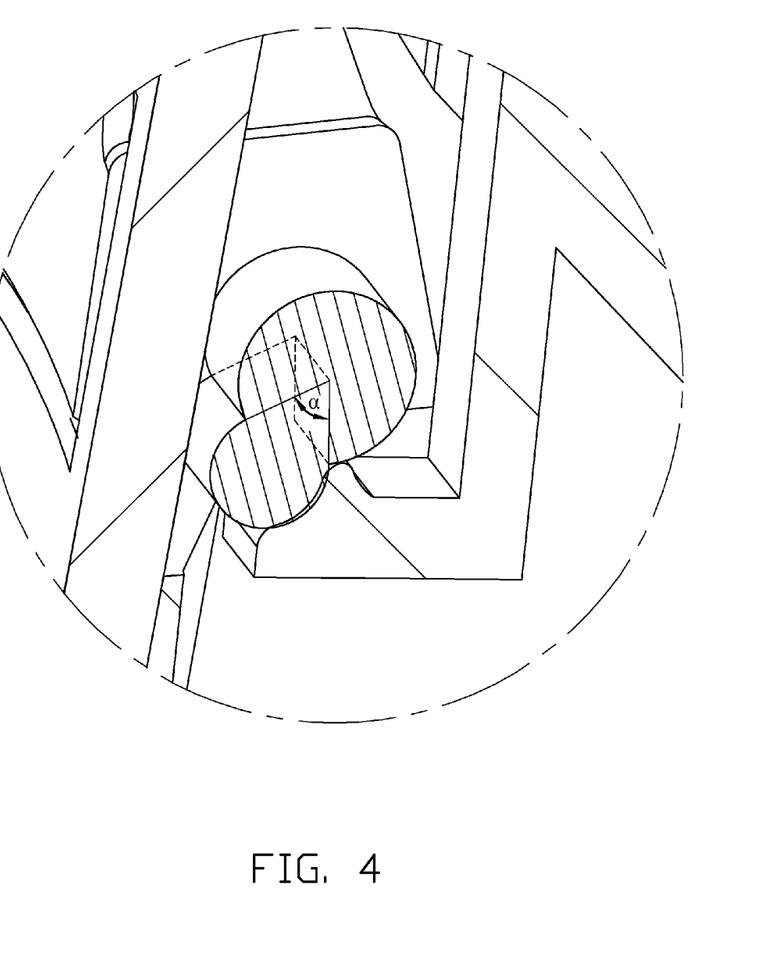
FIG. 4 is an enlarged, isometric view of a circled portion IV of the telephone of FIG. 3.
Figure 5:
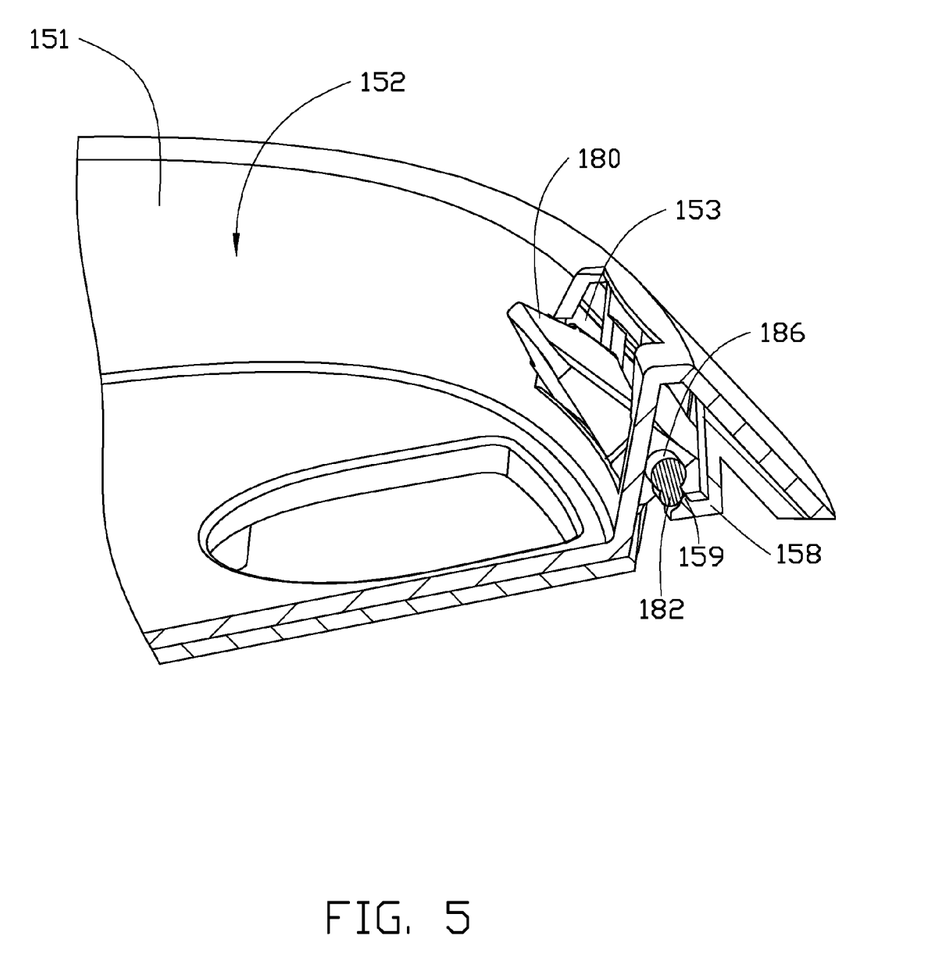
FIGS. 5-6 are similar to FIG. 3, but show the locking mechanism rotated to a second state from the first state.
Figure 6:
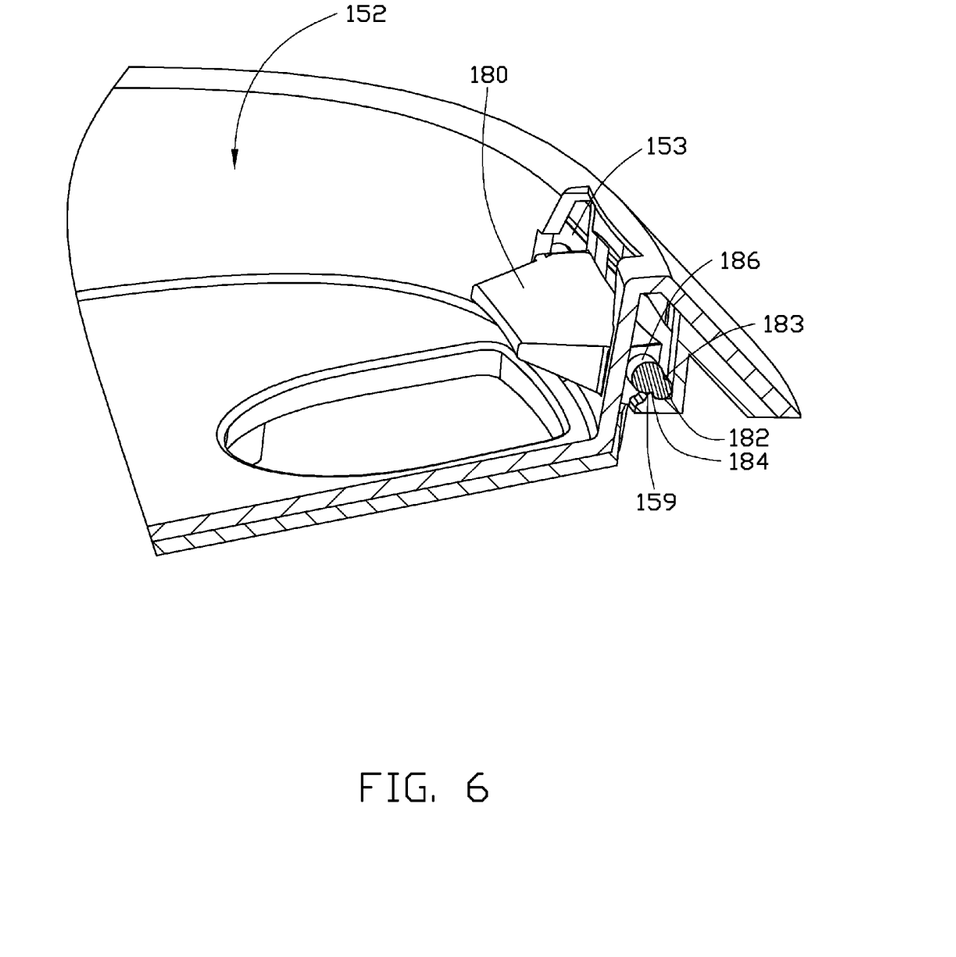

In assembly of the locking mechanism 18 and the telephone set 13, the first spindles 186 are rotatably received in the through holes 155 of the supporting plates 154, the second spindles 182 are located between the supporting plates 154, and the limiting beams 158 of the limiting frames 156 support the second spindles 182. The locking mechanism 18 is rotatably received in the accommodating space 153 of the first portion 15. The locking mechanism 18 is rotatable between a first state (see FIGS. 3-4) and a second state (see FIG. 6). When the locking mechanism 18 is in the first state, the protruding strips 159 of the limiting beams 158 are locked at the first intersection lines 183 of the first and second spindles 186, 182, and the locking block 180 extends along the third direction. The locking block 180 is fully received inside the accommodating space 153. When the locking mechanism 18 is rotated to the second state from the first state (see FIGS. 5-6), the locking block 180 rotates to be parallel to the second direction. The locking block 180 rotates outside of the accommodating space 153, and the protruding strips 159 are locked at the second intersection lines 184.

Figure 7:
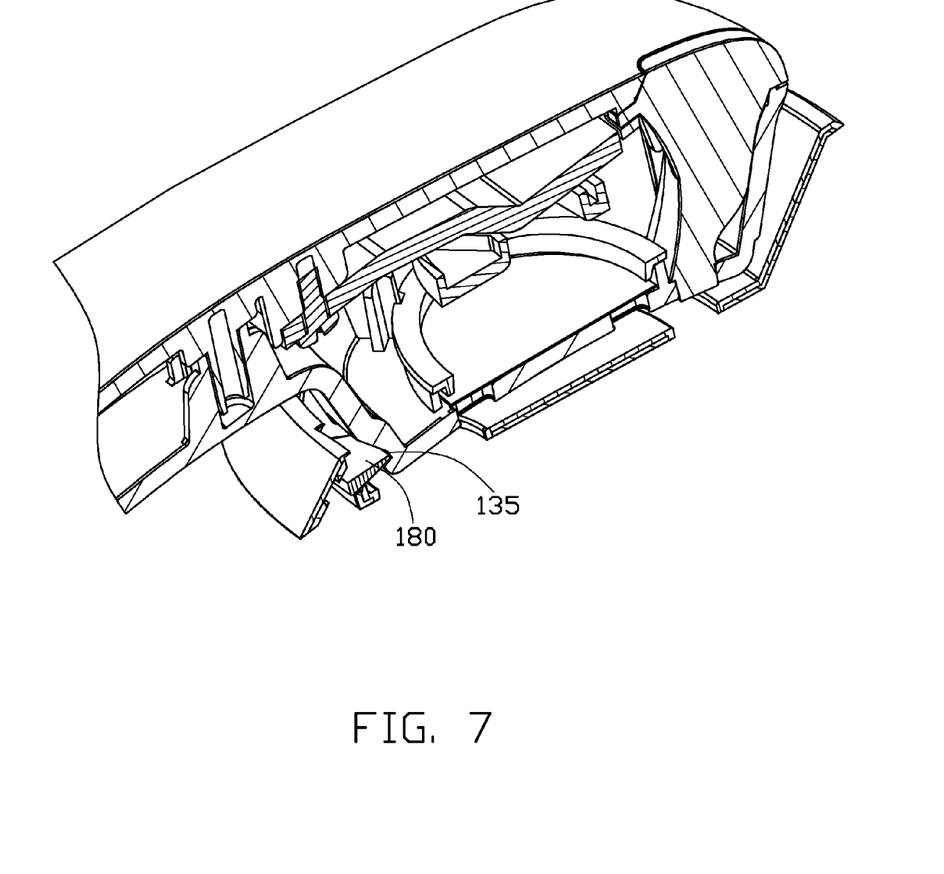
FIG. 7 shows a partial view of the handset engaged with the telephone set of FIG. 1.

With the above-described configuration, because the locking mechanism 18 is switchable between the first state and the second state, when the telephone set 13 is supported at an angle relative to a flat surface, or when the telephone set 13 is mounted on a wall, the user can rotate the locking mechanism 18 to be in the second state, so that the locking block 180 extends out of the accommodating space 153 of the first portion 15. This way, when the handset 12 is placed on the telephone set 13, the locking block 180 of the locking mechanism 18 is locked in the receiving groove 135 of the receiver part 122, so that the handset 12 is prevented from releasing from the telephone set 13 (see FIG. 7).

Figure 8:
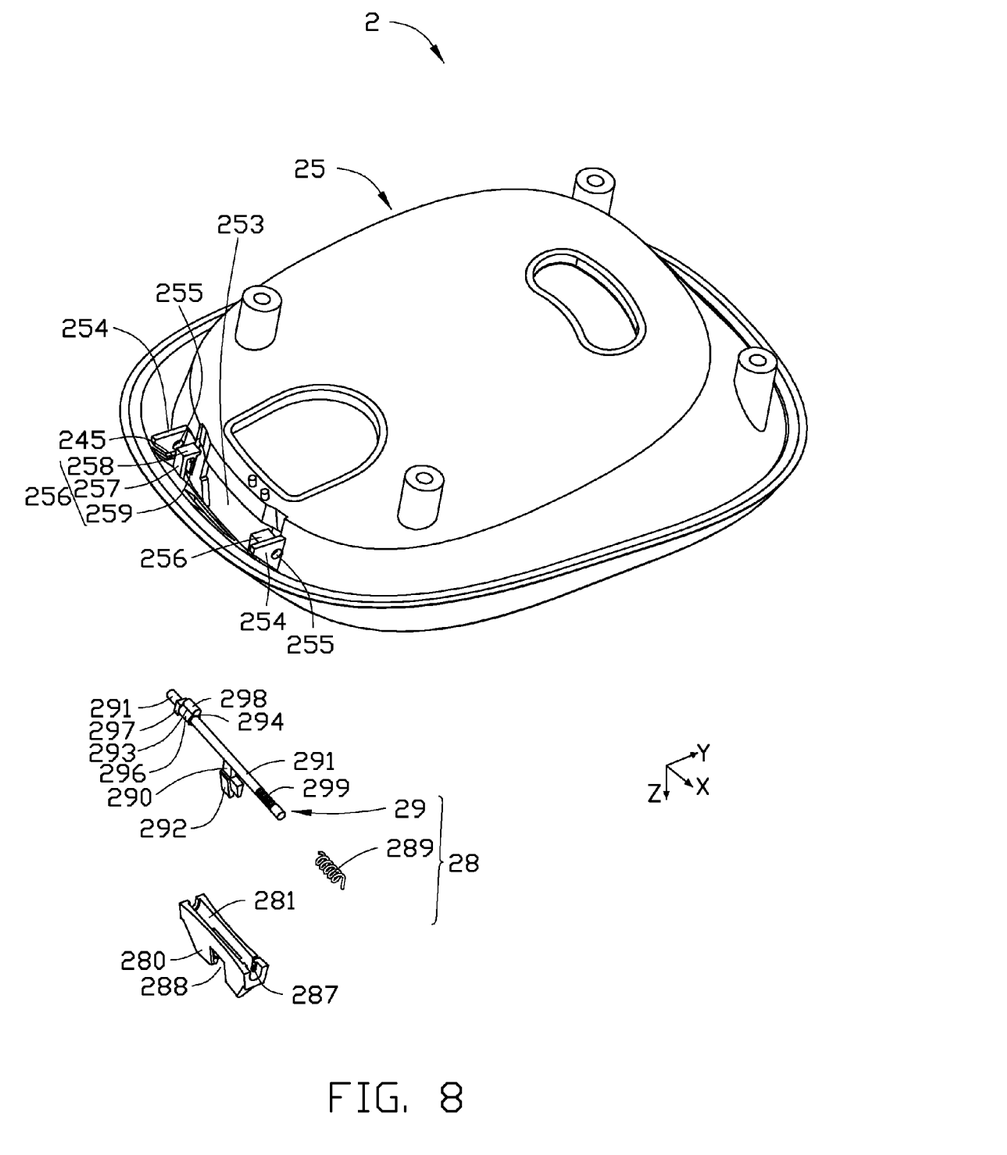
FIGS. 8-9 show a telephone according to a second embodiment of the disclosure.
Figure 9:
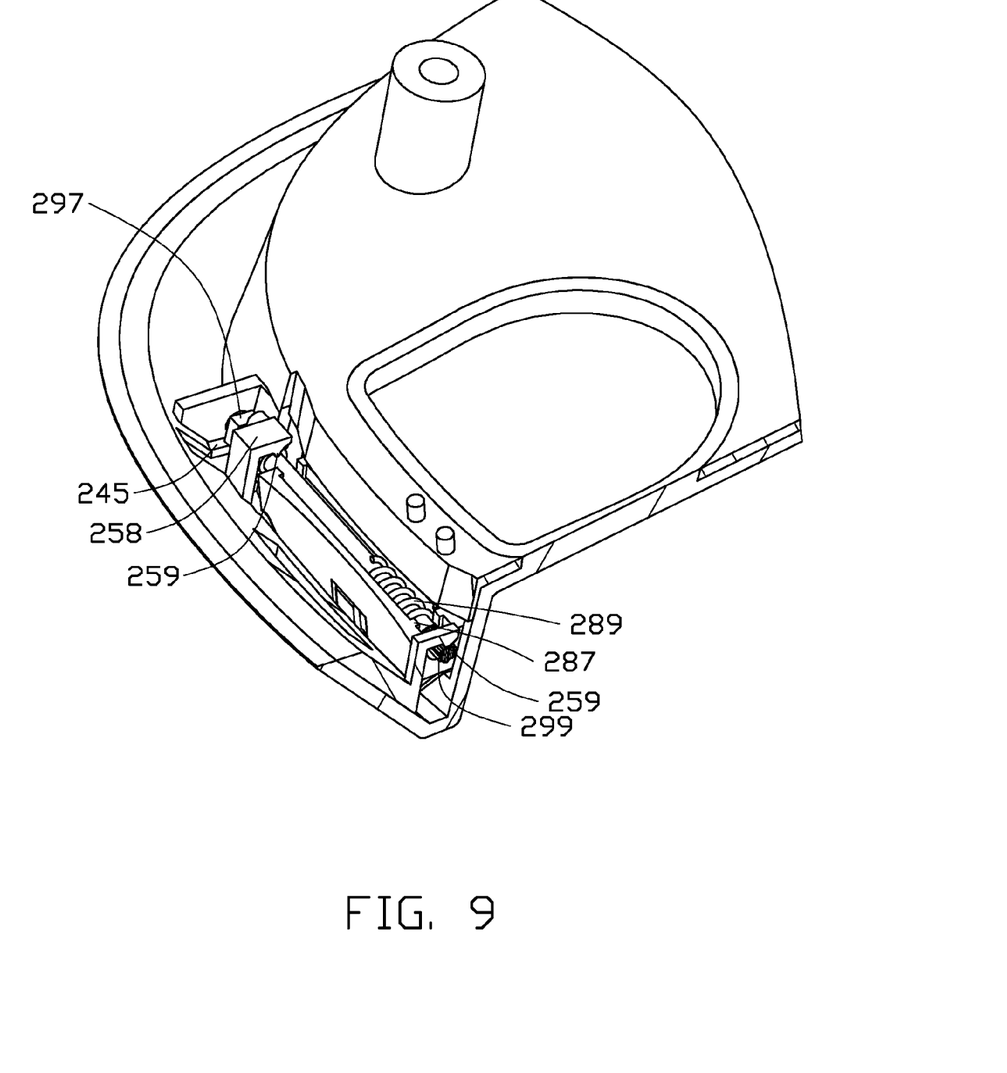

Referring to FIGS. 8-9, a telephone 2 is shown, according to a second embodiment of the present disclosure. The structure of the telephone 2 is similar to the structure of the telephone 1, except that a first sidewall 245 extends from a supporting plate 254, towards another one of the supporting plates 254, and the first sidewall 245 and the supporting plate 254 define a limiting space.

A locking mechanism 28 includes a locking block 280, a rotation member 29, and an elastic member 289.

The locking block 280 defines a first receiving space 281 extending along the first direction, and defines a second receiving space 288 extending along the third direction. The first receiving space 281 communicates with the second receiving space 288. Two second sidewalls 287 extend from opposite sides, respectively, of inner surfaces of the first receiving space 287. The two second sidewalls 287 extend towards each other along the second direction.

The rotation member 29 includes a first spindle 291 extending along the first direction, and a holding pole 290 extending from a surface of the first spindle 291. The holding pole 290 extends perpendicularly to the first spindle 291. A first limiting block 297 sleeves an end of the first spindle 291 adjacent to the first sidewall 245. A second limiting block 292 is attached to a distal end of the holding pole 290. A second spindle 296 sleeves the first spindle 291 adjacent to the first limiting block 297. The second spindle 296 is coaxial with the first spindle 291. A third spindle 298 is connected to the second spindle 296 along their sidewalls. The third spindle 298 and the second spindle 296 are parallel to each other. The second spindle 296 and the third spindle 298 define a first intersection line 293 and a second intersection line 294. The first and second intersection lines 293, 294 are parallel to the first direction. A plurality of ribs 299 protrudes along a circumferential surface of the first spindle 291. The ribs 299 extend along the first direction. The ribs 299 and the second spindle 296 are located at opposite ends of the holding pole 290.

In assembly of the locking mechanism 28, the rotation member 29 is movably engaged with the locking block 280. The rotation member 29 is movable back and forth along the first direction in the first receiving space 281. The second limiting block 292 is received in the second receiving space 288 to prevent the release of the rotation member 29 from the locking block 280. The first spindle 291 is received in the first receiving space 281, such that distal ends of the first spindle 291, the first limiting block 297, the second spindle 296, and the third spindle 298 are located outside of the first receiving space 281. The two second sidewalls 287 sandwich the first spindle 291. The elastic member 289 sleeves on the first spindle 291 and is sandwiched between the holding pole 290 and the second sidewalls 287. The elastic member 289 exerts a resilient force on the rotation member 29 when the rotation member 29 is moved along the first direction.

Referring to FIG. 9, in assembly of the locking mechanism 28 and a first portion 25 of a telephone set, the locking mechanism 28 is engaged in a accommodating space 253 of the first portion 25. Distal ends of the first spindle 291 are received in through holes 255 of the supporting plates 254, the first sidewall 245 supports the first limiting block 297, and the limiting space formed by the first sidewall 245 and the supporting plate 254 prevents the rotation member 29 from rotating. One of the limiting beams 256 supports the third spindle 298, while the other one of the limiting beams 256 supports the ribs 299 of the first spindle 291. The locking block 280 is located between the limiting frames 256.

Because the rotation member 29 is movably received in the first receiving space 281 along the first direction, when the rotation member 29 is moved away from the first sidewall 245 by an external force, the first limiting block 297 releases from the limiting space formed by the first sidewall 245 and the supporting plate 254, and the locking mechanism 28 is rotatable between the first state and the second state. When the external force is released, the rotation member 29 is moved back towards the first sidewall 245 by the elastic member 289, and the first limiting block 297 is locked in the limiting space to prevent the rotation member 29 from rotating.

The locking mechanism 28 is switchable between the first state and the second state when the first limiting sidewall 297 is released from the limiting space formed by the first sidewall 245 and the supporting plate 254.

When the locking mechanism 28 is in the first state, the protruding strip 259 of the limiting beam 258 is locked at the first intersection line 293, and the holding pole 290 and the locking block 280 are parallel to the third direction and are fully received inside the accommodating space 253. When the locking mechanism 28 is rotated to the second state, the holding pole 290 and the locking block 280 rotate to be parallel to the second direction and extend out of the accommodating space 253. The second and third spindles 296, 298 are rotated, and the protruding strip 159 of the limiting beam 158 is locked at the second intersection line 294.

Because the locking mechanism 28 is switchable between the first state and the second state, when the telephone set is supported at an angle relative to a flat surface, or when the telephone is mounted on a wall, the locking mechanism 28 can be rotated in the second state, so that the locking block 280 extends out of the accommodating space 253 of the first portion 25. When the handset is placed on the telephone set, the receiver part is received in the first recess of the first portion, and the locking block 280 of the locking mechanism 28 is locked in the receiving groove of the receiver part of the handset and prevents the release of the handset from the telephone set.

It is believed that the present embodiments and their advantages will be understood from the foregoing description, and it will be apparent that various changes may be made thereto without departing from the spirit and scope of the description or sacrificing all of their material advantages, the examples hereinbefore described merely being exemplary embodiments.

What is claimed is:

1. A telephone, comprising:
 a handset comprising a receiver part and a microphone part, the receiver part defining a receiving groove facing the microphone part;
 a telephone set comprising a casing, the casing comprising a holding part for holding the handset, the handset being detachably engaged with the holding part, the holding part comprising a first portion receiving the receiver part and a second portion receiving the microphone part, the first portion defining a first recess to receive the receiver part and an accommodating space at an inner surface of the first portion, the accommodating space communicating with the first recess and corresponding to the receiving groove;
 two supporting plates are fixed in the accommodating space, each supporting plate defines a through hole, the two through holes of the supporting plates are coaxial with each other, and a connecting line between the centers of the through holes is parallel to a first direction;
 a locking mechanism comprising a locking block and two first spindles extending from two opposite sides of the locking block, the first spindles extend along the first direction and rotatably received in the through holes of the supporting plates; and two limiting frames are fixed in the accommodating space, and located between the two supporting plates, each limiting frame comprises a the limiting beam extending along a second direction perpendicular to the first direction and a the connecting beam extending extends along a third direction perpendicular to the first and second directions, and the connecting beam interconnects the first portion and the limiting beam;

wherein the locking mechanism is rotatably received in the accommodating space and switchable between a first state and a second state; and in the first state, the locking block is inside the accommodating space; and in the second state, the locking block rotates to extend outside of the accommodating space.

2. The telephone of claim 1, wherein the locking mechanism further comprises two second spindles extending along the first direction, the first spindles and the second spindles are parallel to each other and are connected to each other along side surfaces of the first and second spindles, the connected first spindle and the second spindle define a first intersection line and a second intersection line, the first and second intersection lines are parallel to the first direction, a length of the first spindle is greater than a length of the second spindle, and the limiting beams support the second spindle of the locking mechanism.

3. The telephone of claim 2, wherein each limiting beam comprises a protruding strip extending from the limiting beam, when the locking mechanism is in the first state, the limiting beams support the second spindle at the first intersection lines, when the locking mechanism is in the second state, the limiting beams support the second spindle at the second intersection lines.

4. A telephone, comprising:

a handset comprising a receiver part and a microphone part, the receiver part defining a receiving groove facing the microphone part;

a telephone set comprising a casing, the casing comprising a holding part for holding the handset, the handset being detachably engaged with the holding part, the holding part comprising a first portion receiving the receiver part and a second portion receiving the microphone part, the first portion defining a first recess to receive the receiver part and an accommodating space at an inner surface of the first portion, the accommodating space communicating with the first recess and corresponding to the receiving groove; and a locking mechanism rotatably mounted to the first portion, the locking mechanism comprising a locking block, the locking block extending out of the accommodating space to insert into the receiving groove and supporting the handset when the telephone is hung with the receiver part received in the first portion being above the a microphone part received in the second portion; the locking block being kept retracting in the accommodate space and separated from the handset when the telephone is placed with the receiver part received in the first portion and the microphone part received in the second portion being at a same level.

5. The telephone of claim 4, wherein the locking mechanism further comprises a rotation member, the rotation member is engaged with the locking block and configured to rotate to make the locking block enter to a first state of being received in the accommodating space or enter to a second state of extending out of the accommodating space to engaged with the first portion, a limiting frame protruding from the casing, the rotation member is blocked by the limiting frame to keep the locking block being in the first state or in the second state when the locking block enters to the first state or the second state.

6. The telephone of claim 5, wherein two supporting plates are fixed in the accommodating space, each supporting plate defines a through hole, the two through holes of the supporting plates are coaxial with each other, and a connecting line between the centers of the through holes is parallel to a first direction, one of the supporting plates comprises a first sidewall extends from the one of the supporting plates towards the other one of the supporting plates; the rotation member comprises a first spindle and a first limiting block surrounds the first spindle adjacent to the first sidewall, distal ends of the first spindle are rotatably received in the through holes of the supporting plates, the locking block is located between the supporting plates, when the rotation member moves towards the first sidewall, the first sidewall supports the first limiting block and prevents the rotation member from rotating, when the rotation member moves away from the first sidewall, the first limiting block releases from the first sidewall, the locking mechanism is able to rotate from the first state to the second state.

7. The telephone of claim 6, wherein the two limiting frames are located between the two supporting plates, each limiting frame comprises a the limiting beam extending along a second direction perpendicular to the first direction and a connecting beam extending along a third direction perpendicular to the first and second directions, and the connecting beam interconnects the first portion and the limiting beam.

8. The telephone of claim 7, wherein a second spindle surrounds the first spindle at a location adjacent to the first limiting block, the second spindle is coaxial to the first spindle, a third spindle and the second spindle are parallel to each other and connect to each other along side surfaces of the second and third spindles, connected the second spindle and the third spindle define a first intersection line and a second intersection line, the first and second intersection lines are parallel to the first direction.

9. The telephone of claim 8, wherein a plurality of ribs extend from the circumference of the first spindle and extends along the first direction, the ribs and the second spindle are at opposite sides of the holding pole, one of the limiting frames supports the third spindle, and the other one of the limiting frames supports the first spindle at the ribs of the first spindle.

10. The telephone of claim 9, wherein each limiting beam comprises a protruding strip extending from the limiting beam, when the locking block is in the first state, the protruding strip supports the third spindle at the first intersection line, when the locking block is in the second state, the protruding strip supports the third spindle at the second intersection line.

11. The telephone of claim 10, wherein the locking block defines a first receiving space extending along the first direction and a second receiving space extending along a third direction, and the first receiving space communicates with the second receiving space, two second sidewalls extend from opposite sides of inner surfaces of the first receiving space, and the two second sidewalls extend towards each other and extend along the second direction.

12. The telephone of claim 11, wherein a holding pole extends from the first spindle at a circumference of the first spindle, the holding pole extends perpendicular to the first spindle, a second limiting block is attached to the holding pole at a distal end of the holding pole, and the second limiting block is received in the second receiving space and prevents the release of the rotation member from the locking block.

13. A telephone, comprising:
a handset comprising a receiver part and a microphone part, the receiver part defining a receiving groove facing the microphone part;
a telephone set comprising a casing, the casing comprising a holding part for holding the handset, the handset being detachably engaged with the holding part, the holding part comprising a first portion receiving the receiver part and a second portion receiving the microphone part, the first portion defining a first recess to receive the receiver part and an accommodating space at an inner surface of the first portion, the accommodating space communicating with the first recess and corresponding to the receiving groove; and
a locking mechanism comprising a locking block;
wherein the locking mechanism is rotatably received in the accommodating space and switchable between a first state and a second state; when a first force is applied to the locking mechanism to make the locking mechanism to rotate from the first state to the second state, the locking block is rotated to extend outside of the accommodating space to engage with the receiver part, when the first force is released, the locking block is remained in the second state; when a second force is applied to the locking mechanism to make the locking mechanism is rotated from the second state to the first state, the locking block is rotated to inner of the accommodating space to separate from the receiver part, and when the second force is released, the locking block is remained in the first state.

14. The telephone of claim 13, wherein the locking mechanism further comprises a rotation member, the rotation member is engaged with the locking block and configured to rotate to make the locking block enter to a first state of being received in the accommodating space or enter to a second state of extending out of the accommodating space, a limiting frame protruding from the casing, the rotation member is blocked by the limiting frame to keep the locking block being in the first state or in the second state when the locking block enters to the first state or the second state.

15. The telephone of claim 14, wherein two supporting plates are fixed in the accommodating space, each supporting plate defines a through hole, the two through holes of the supporting plates are coaxial with each other, and a connecting line between the centers of the through holes is parallel to a first direction, one of the supporting plates comprises a first sidewall extends from the one of the supporting plates towards the other one of the supporting plates; the rotation member comprises a first spindle and a first limiting block surrounds the first spindle adjacent to the first sidewall, distal ends of the first spindle are rotatably received in the through holes of the supporting plates, the locking block is located between the supporting plates, when the rotation member moves towards the first sidewall, the first sidewall supports the first limiting block and prevents the rotation member from rotating, when the rotation member moves away from the first sidewall, the first limiting block releases from the first sidewall, the locking mechanism is able to rotate from the first state to the second state.

16. The telephone of claim 15, wherein the two limiting frames are located between the two supporting plates, each limiting frame comprises a the limiting beam extending along a second direction perpendicular to the first direction and a connecting beam extending along a third direction perpendicular to the first and second directions, and the connecting beam interconnects the first portion and the limiting beam.

17. The telephone of claim 16, wherein a second spindle surrounds the first spindle at a location adjacent to the first limiting block, the second spindle is coaxial to the first spindle, a third spindle and the second spindle are parallel to each other and connect to each other along side surfaces of the second and third spindles, connected the second spindle and the third spindle define a first intersection line and a second intersection line, the first and second intersection lines are parallel to the first direction.

18. The telephone of claim 17, wherein a plurality of ribs extend from the circumference of the first spindle and extends along the first direction, the ribs and the second spindle are at opposite sides of the holding pole, one of the limiting frames supports the third spindle, and the other one of the limiting frames supports the first spindle at the ribs of the first spindle.

19. The telephone of claim 18, wherein each limiting beam comprises a protruding strip extending from the limiting beam, when the locking block is in the first state, the protruding strip supports the third spindle at the first intersection line, when the locking block is in the second state, the protruding strip supports the third spindle at the second intersection line.

20. The telephone of claim 19, wherein the locking block defines a first receiving space extending along the first direction and a second receiving space extending along a third direction, and the first receiving space communicates with the second receiving space, two second sidewalls extend from opposite sides of inner surfaces of the first receiving space, and the two second sidewalls extend towards each other and extend along the second direction.

* * * * *